US011063418B2

(12) United States Patent
Govindaraj

(10) Patent No.: US 11,063,418 B2
(45) Date of Patent: Jul. 13, 2021

(54) SYSTEMS AND METHODS FOR OVERCURRENT PROTECTION FOR WIRELESS POWER RECEIVERS

(71) Applicant: Verily Life Sciences LLC, South San Francisco, CA (US)

(72) Inventor: Arvind Govindaraj, San Bruno, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 163 days.

(21) Appl. No.: 16/387,460

(22) Filed: Apr. 17, 2019

(65) Prior Publication Data

US 2019/0326743 A1    Oct. 24, 2019

Related U.S. Application Data

(60) Provisional application No. 62/659,904, filed on Apr. 19, 2018.

(51) Int. Cl.
| H02H 3/00 | (2006.01) |
| H02H 3/08 | (2006.01) |
| H02J 50/10 | (2016.01) |
| H01H 37/54 | (2006.01) |
| H01H 85/00 | (2006.01) |
| H02H 3/02 | (2006.01) |

(52) U.S. Cl.
CPC .......... *H02H 3/08* (2013.01); *H01H 37/5409* (2013.01); *H01H 85/00* (2013.01); *H02H 3/021* (2013.01); *H02J 50/10* (2016.02); *H01H 2085/0004* (2013.01)

(58) Field of Classification Search
None
See application file for complete search history.

(56) References Cited

U.S. PATENT DOCUMENTS 7,212,110 B1    5/2007  Martin et al.
8,259,428 B2 *  9/2012  Mollema ................ H02H 9/042
                                                        361/103

(Continued)

OTHER PUBLICATIONS

Low et al., "Method of load/fault detection for loosely coupled planar wireless power transfer system with power delivery tracking", IEEE Transactions on Industrial Electronics vol. 57, No. 4, Apr. 2010, 1478-1486.

(Continued)

*Primary Examiner* — Stephen W Jackson
(74) *Attorney, Agent, or Firm* — Kilpatrick Townsend & Stockton LLP

(57) ABSTRACT

One example device for overcurrent protection for wireless power receivers includes a wireless power antenna comprising a wire coil; a conditioning circuit electrically coupled to the wireless power antenna to receive an electric power signal from the wireless power antenna; a temperature-sensitive fuse electrically coupled between the wireless power antenna and the conditioning circuit and configured to electrically decouple the wireless power antenna from the conditioning circuit in response to being blown; and a thermal energy source configured to generate thermal energy based on an electrical signal from an output of the conditioning circuit, the thermal energy source positioned proximate the temperature-sensitive fuse.

32 Claims, 8 Drawing Sheets

(56) References Cited

U.S. PATENT DOCUMENTS

| | | |
|---|---|---|
| 10,320,230 B2* | 6/2019 | Golko ................... H02J 50/70 |
| 2008/0300660 A1 | 12/2008 | John |
| 2009/0261778 A1 | 10/2009 | Kook |
| 2009/0268356 A1 | 10/2009 | Mollema et al. |
| 2014/0239732 A1 | 8/2014 | Mach et al. |
| 2016/0022889 A1 | 1/2016 | Bluvshtein et al. |
| 2017/0237302 A1 | 8/2017 | Sorge |

OTHER PUBLICATIONS

International Application No. PCT/US2019/028132 , "International Search Report and Written Opinion", dated Jul. 17, 2019, 10 pages.

\* cited by examiner

SYSTEMS AND METHODS FOR OVERCURRENT PROTECTION FOR WIRELESS POWER RECEIVERS

CROSS-REFERENCE TO RELATED APPLICATIONS

This application claims priority to U.S. Provisional Patent Application No. 62/659,904, filed Apr. 19, 2018, titled "Systems and Methods for Overcurrent Protection for Wireless Power Receivers," the entirety of which is hereby incorporated by reference.

FIELD

The present application generally relates to wireless power receivers, and more particular relates to systems and methods for overcurrent protection for wireless power receivers.

BACKGROUND

Wireless power transfer using high-frequency magnetic fields (near field) may employed in certain types of devices, such as mobile phones. A transmit ("TX") coil may be excited by a high-frequency alternating current, which generates an electromagnetic field ("EMF") that induces a current in a receive ("RX") coil embedded within a device. The received current is then provided to electronic components that may rectify the received energy and provide to other portions of the device. Wireless power receivers are typically designed to operate over a range of magnetic field intensities expected from the transmitter. However it is possible to overload the wireless power receiver by transmitting a strong EMF to the wireless power receiver. Such an EMF might damage or destroy the device due to the large amount of received power.

SUMMARY

Various examples are described for systems and methods for overcurrent protection for wireless power receivers. For example, one example device includes a wireless power antenna comprising a wire coil; a conditioning circuit electrically coupled to the wireless power antenna to receive an electric power signal from the wireless power antenna; a temperature-sensitive fuse electrically coupled between the wireless power antenna and the conditioning circuit and configured to electrically decouple the wireless power antenna from the conditioning circuit in response to being blown; and a thermal energy source configured to generate thermal energy based on an electrical signal from an output of the conditioning circuit, the thermal energy source positioned proximate the temperature-sensitive fuse.

One example method for overcurrent protection for wireless power receivers includes receiving, by a wireless power antenna comprising a wire coil, energy from an electromagnetic field ("EMF"); electrically conditioning, by a conditioning circuit electrically coupled to the wireless power antenna, the received energy to generate a voltage signal; generating, by a thermal energy source, thermal energy using the generated voltage signal; and blowing a temperature-sensitive fuse using the generated thermal energy to electrically decouple the wireless power antenna from the conditioning circuit.

A second example method for overcurrent protection for wireless power receivers includes physically coupling (i) a wireless power antenna comprising a wire coil, (ii) a conditioning circuit, (iii) a temperature-sensitive fuse, and (iv) a thermal energy source to a substrate; electrically coupling the wireless power antenna and the conditioning circuit to the temperature-sensitive fuse, wherein the temperature-sensitive fuse electrically couples the wireless power antenna to the conditioning circuit; and wherein the thermal energy source is electrically coupled to a circuit configured to activate the thermal energy source, the thermal energy source positioned in proximity to the temperature-sensitive fuse.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for overcurrent protection for wireless power receivers. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1:
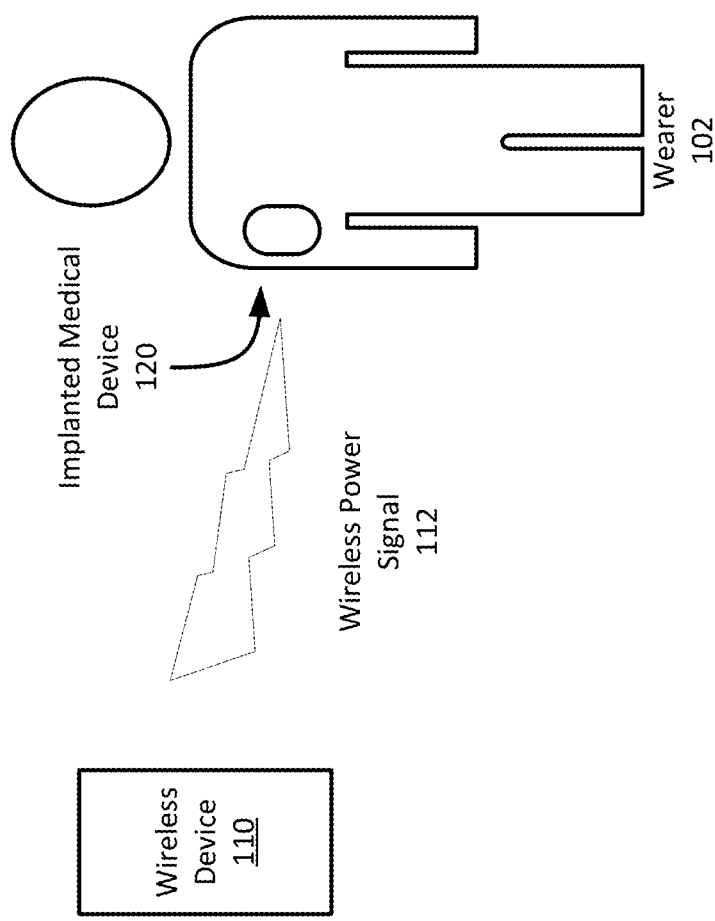
FIG. 1 shows an example implanted medical device capable of receiving wireless power.

Referring to FIG. 1, an individual 102 has a medical condition for which she has had a medical device 120 implanted under her skin. In this example, the implanted medical device is a neuro-stimulation device 120 that provides therapeutic electrical impulses to a nerve bundle. To supply power to the implanted device 120, the wireless device 110 can be used to wirelessly transmit power 112 to the implanted device 120. In this example, the wireless device 110 generates an electromagnetic field ("EMF") 112 that excites a coil antenna within the implanted device 120. The energy received by the coil antenna is supplied to a rectifier circuit, which conditions the energy into a form that is usable by the electronics within the implanted device. For example, the rectifier circuit may convert the alternating current ("AC") EMF energy into a direct current ("DC") signal at a substantially constant voltage, e.g., 5 volts ("V").

In this example, the implanted device also includes circuitry to help protect the sensitive electronics within the implanted device 120 from damage in the event too much power is transmitted to the implanted device 120. For example, the wireless device 110 may be programmed with an incorrect setting or a malicious actor may try to transmit a large amount of power to the implanted device 120 to try to damage or destroy its electronics. To help prevent such overloading of the electronics, a temperature-sensitive resettable fuse has been included between the implanted device's coil antenna and the rectifier circuit, which can be blown to electrically decouple the rectifier from the antenna, thereby cutting off power to the implanted device's electronics. Over time, after the excessive power has been discontinued, the fuse resets and the device 120 can once again accept wireless power.

However, unlike in a typical application, the heat supplied to the fuse is not supplied by the energy flowing through the fuse. Instead, other circuitry is placed in close proximity to the fuse, and when this other circuitry outputs sufficient heat, the fuse is heated and blows. Specifically, in this example, the output of the rectifier circuit is supplied to a voltage clamp, which clamps the output voltage to a predefined voltage, e.g., 5 V. As the amount of power supplied to the voltage clamp increases, it generates thermal energy, i.e., heat. By locating the voltage clamp in proximity to the temperature-sensitive resettable fuse, the heat output by the voltage clamp heats the fuse, blowing it and protecting the implanted device's electronics. Thus, the device indirectly heats the temperature-sensitive resettable fuse, causing it to break the electrical connection between the coil antenna and the rectifier circuit. Such a technique may provide robust protection against continuous overloading the electronics of the implantable device, while permitting transient events due to the thermal inertia of the voltage clamp circuitry.

This illustrative example is given to introduce the reader to the general subject matter discussed herein and the disclosure is not limited to this example. The following sections describe various additional non-limiting examples and examples of systems and methods for overcurrent protection for wireless power receivers.

Figure 2:
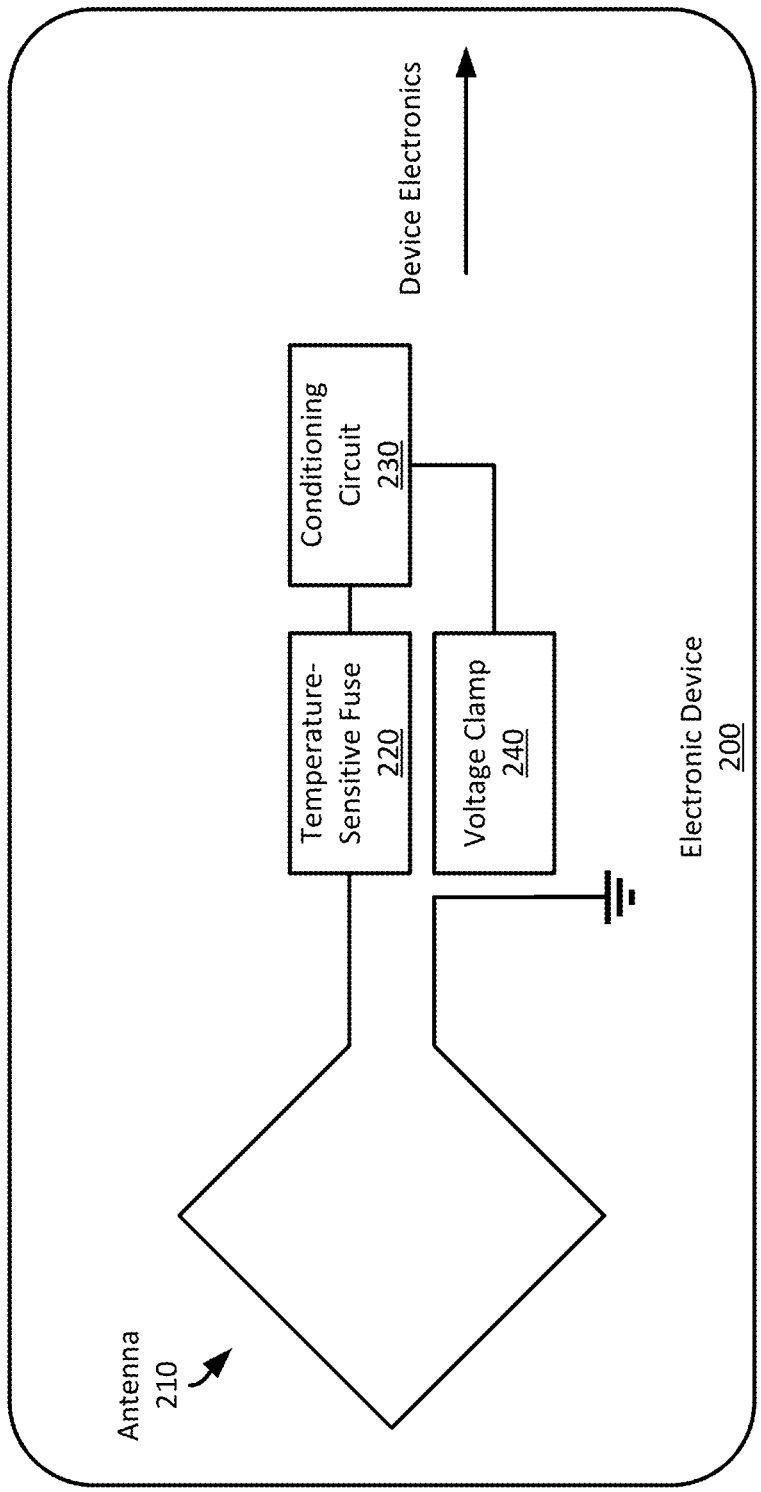
FIGS. 2-5 show example electronic devices including example systems for overcurrent protection for wireless power receivers.

Referring now to FIG. 2, FIG. 2 shows a diagram of an electronic device 200 that is able to receive power wirelessly from a remote device. A large variety of suitable electronic devices may employ techniques according to this disclosure, such as implantable medical devices as discussed above, as well as wearable medical devices, e.g., continuous glucose monitors, electrocardiogram sensors, insulin pumps, blood pressure or pulse sensors, blood oxygen (SpO2) sensors, etc.; other wearable devices such as smartwatches, wristbands, earphones or earbuds, smart glasses, etc.; or other electronic devices, including smartphones, tablets, phablets, laptops, etc. In general, any device that can wirelessly receive electrical power to power its electronics or charge its battery may employ techniques according to this disclosure.

The electronic device 200 in this example includes a coil antenna 210 to receive energy from an EMF generated by another device. The antenna 210 is electrically coupled to a temperature-sensitive fuse 220, which is electrically coupled to a conditioning circuit 230. The fuse 220 is connected in series between the antenna 210 and the conditioning circuit 230 so that if the fuse is blown, it electrically decouples the antenna 210 from the conditioning circuit 230 and thus, electrical energy may be prevented from flowing from the antenna 210 to the conditioning circuit 230 and to the electronics within the device.

In this example, the temperature-sensitive fuse is a temperature-sensitive resettable fuse, such as a polymeric positive temperature coefficient ("PPTC") fuse, though the temperature-sensitive fuse need not be resettable in some examples. However, other suitable components may be employed to act as a fuse to break a circuit between the antenna 210 and the conditioning circuit 230, including shape memory alloys ("SMA"), which may change shape under heating to electrically disconnect the antenna 210 from the conditioning circuit 230. Some example SMAS may return to an initial shape when cooled, thereby provide a resettable temperature-sensitive fuse; however, some examples may not employ an SMA that returns to its initial shape. Similarly, a bimetallic strip may be employed instead of an SMA. As the bimetallic strip heats, it may change shape due to differences in thermal expansion coefficients between the two metals forming the strip, thereby breaking an electrical connection between the antenna 210 and the conditioning circuit 230. Bimetallic strips may also provide resettable temperature-sensitive fuses in some examples as they may return to their original shapes after cooling to ambient temperature. Any other suitable temperature-sensitive fuse may be employed, including temperature-sensitive resettable fuses.

As discussed above, the conditioning circuit 230 is electrically coupled to the temperature-sensitive fuse 220 and to a voltage clamp 240. In this example, the conditioning circuit 230 is a full bridge rectifier to convert the AC energy received from the antenna 210 into DC energy. However, other types of conditioning circuits 230 may be employed according to different examples. For example, other types of AC to DC converters may be employed, including other types of bridge rectifiers (e.g., half-bridge), or switching power supplies may be employed in some examples to convert the AC energy to DC energy.

In this example, the electronic device 200 also employs a voltage clamp 240 to provide a predetermined voltage to the electronic device's electronics. For example, if the device electronics are configured to operate at 3.2 V, the voltage clamp may be configured to clamp the conditioning circuit's output to 3.2 V. However, depending on the amount of power output by the conditioning circuit 230, the voltage clamp may generate heat as it maintains the 3.2 V level. Thus, the voltage clamp 240 has been positioned in proximity to the temperature sensitive fuse 220. If too much power is supplied to the voltage clamp 240 for a long enough time, it will heat up, which in turn will transfer heat to the temperature-sensitive fuse 220, blowing it. After the fuse 220 has been blown, power will no longer flow to the voltage clamp, allowing it, and in turn the fuse, to cool. After the fuse 220 has sufficiently cooled, in some examples, it may reset, once again allowing electrical power to flow from the antenna 210 to the conditioning circuit.

It should be appreciated that while the conditioning circuit and the voltage clamp 240 are shown as separate components in this example, they may be integrated into a single circuit or may be embodied within a semiconductor device, such as an application-specific integrated circuit ("ASIC"). However, in this example, the voltage clamp 240 is constructed using a Zener diode. Other suitable voltage clamps may be employed. For example, a metal-oxide semiconducting field effect transistor ("MOSFET") switch that can be activated by a voltage threshold or voltage comparator circuit, flowing current through the switch, thereby heating it.

For example, a reference voltage may be applied to an input of a voltage comparator circuit, and a voltage received from the conditioning circuit 230 may be applied to another input of the voltage comparator. When the voltage received from the conditioning circuit 230 exceeds the reference voltage, the voltage comparator can then activate the MOSFET to apply thermal energy to the temperature-sensitive fuse 220. In some examples, two reference voltages may be applied to the voltage comparator, a high voltage and a low voltage. Further, in some examples, a synchronous or active rectifier may be employed that can be shorted when sufficient voltage or current energy flows through the circuit to generate heat to blow the fuse 220.

In this example, the voltage clamp 240 transfers thermal energy to the fuse 220 by radiating or convecting heat towards the fuse 220 based on their proximity. The distance between the voltage claim 240 and the fuse 220 may be selected based on the speed at which the fuse should be blown by excessive power reception at the antenna. Based on the voltage clamp's design, electrical energy above a pre-selected threshold may generate excess heat that can be used to blow the fuse 220. The amount by which the threshold is exceeded may result in a greater amount of heat. Thus, the tolerance of the electronic device's circuitry to overloading as well as the speed at which the fuse is desired to be blown can be used to determine a distance between the voltage clamp and the temperature sensitive fuse. However, in some examples, the voltage clamp 240 may be in physical contact with the fuse 220, or it may be physically coupled to a thermally conductive material that is also physically coupled to the fuse.

Figure 3:
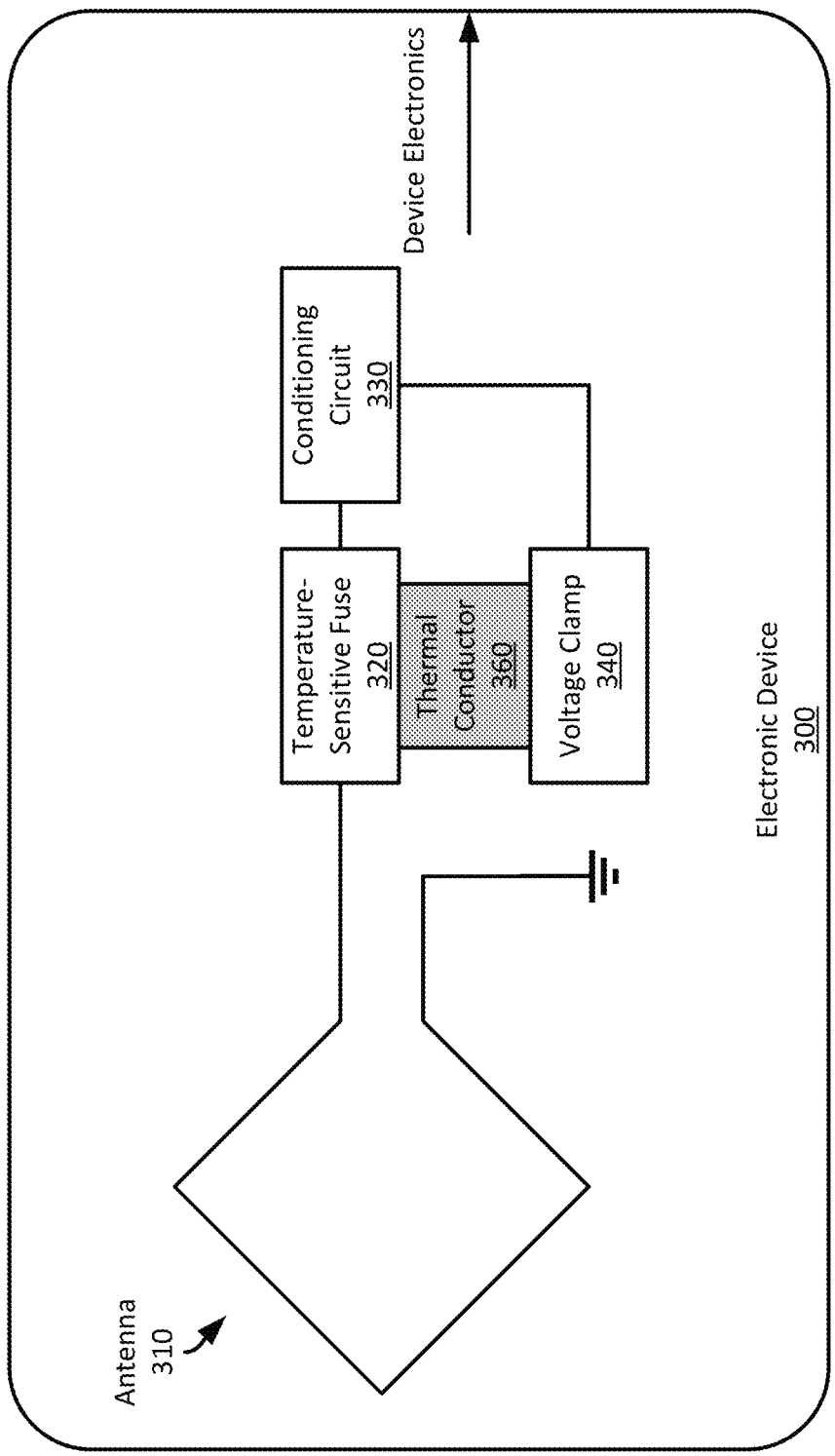

Referring now to FIG. 3, FIG. 3 shows a diagram of an electronic device 300 that is able to receive power wirelessly from a remote device. The electronic device 300 may be any suitable electronic device, such as those discussed above with respect to the electronic device 200 of FIG. 2.

Similar to the electronic device 200 of FIG. 2, the electronic device 300 in FIG. 3 includes an antenna 310 to receive energy from an oscillating EMF. The antenna 310 is electrically coupled to a temperature-sensitive fuse 320, which is electrically connected in series between the antenna 310 and a conditioning circuit 330. Any suitable temperature-sensitive fuse 320 and conditioning circuit 330 as discussed herein may be employed according to different examples. The conditioning circuit 330 is electrically coupled to a voltage clamp 340, such as any of the voltage clamps 240 discussed above with respect to FIG. 2. In this example, however, a thermal conductor 360 is positioned between the voltage clamp 340 and the temperature-sensitive fuse 320, and is physically coupled to each. Thus, the thermal conductor 360 can conduct thermal energy from the voltage clamp 340 to the fuse 320, rather than using radiation or convection to supply the thermal energy to the fuse 320 as described above with respect to FIG. 2.

For example, the thermal conductor 360 may be a metal member, such as copper or aluminum, physically coupled to both the voltage clamp 340 and the fuse 320 to conduct heat to the fuse. In some examples, the voltage clamp 340 and the fuse 320 may be mounted to a substrate, such as a printed circuit board ("PCB"), that has a metal region formed on it, to which both the voltage clamp 340 and fuse 320 are mounted. Such a metal region may conduct heat along the substrate from the voltage clamp 340 to the fuse 300. Each of these techniques may be used to transfer thermal energy from the voltage clamp 340 to the fuse 320 to allow the voltage clamp 340 to serve as a thermal trigger to blow the fuse 320. Further, any suitable thermal conductor 360 may be employed. While copper and aluminum are discussed above, other suitable thermal conductors may be employed, such as any suitable metal, including gold, silver, platinum, steel, etc., or carbon-based thermal conductors, such as graphite, diamond, etc.

Figure 4:
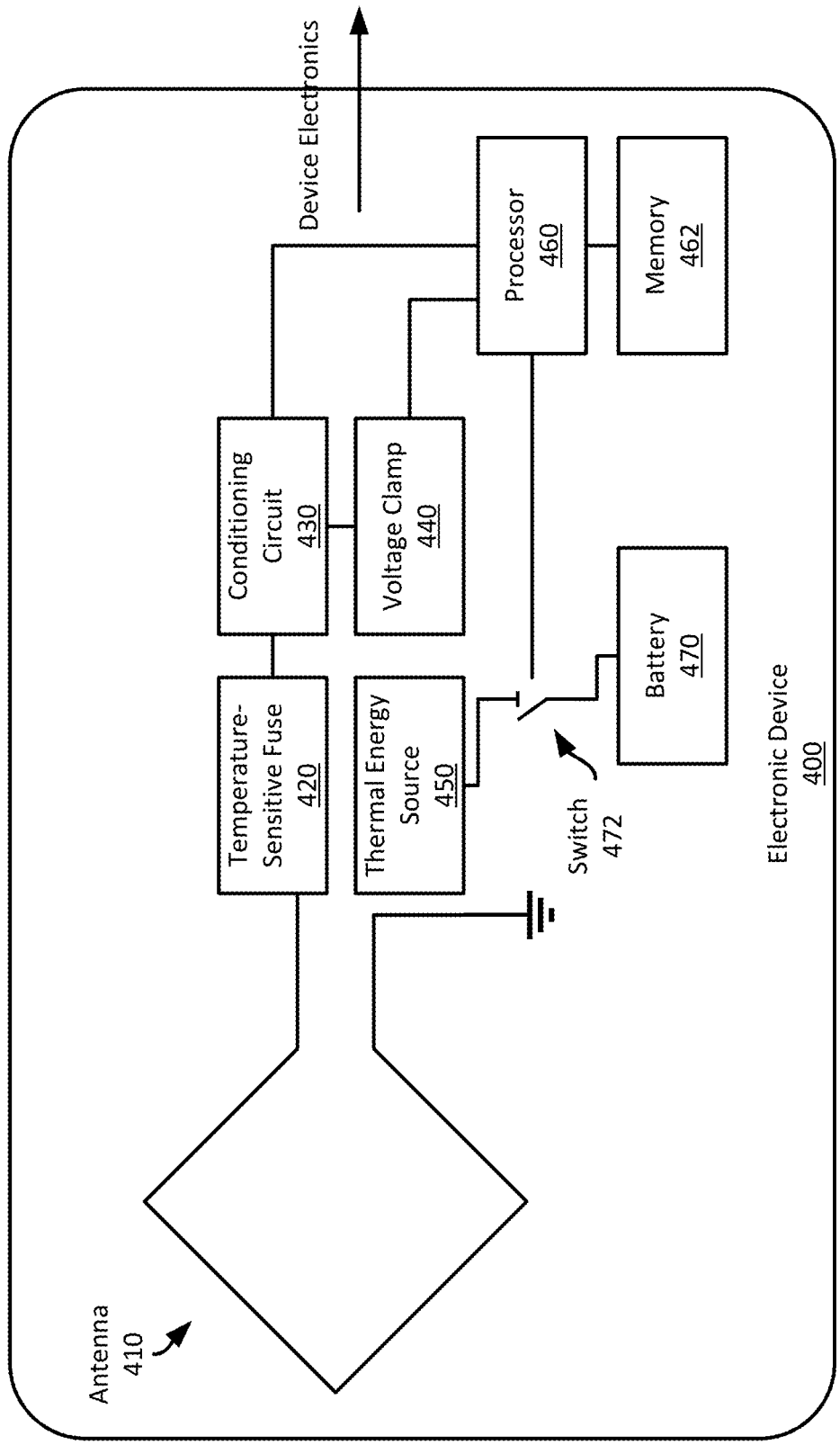

Referring now to FIG. 4, FIG. 4 shows a diagram of an electronic device 400 that is able to receive power wirelessly from a remote device. The electronic device 400 may be any suitable electronic device, such as those discussed above with respect to the electronic device 200 of FIG. 2.

The electronic device 400 in this example includes an antenna 410 to receive energy from an oscillating EMF. The antenna 410 electrically coupled to a temperature-sensitive fuse 420, which is electrically connected in series between the antenna 410 and a conditioning circuit 430. Any suitable temperature-sensitive fuse 420 and conditioning circuit 430 as discussed herein may be employed according to different examples. The conditioning circuit 430 is electrically coupled to a voltage clamp 440, such as any of the voltage clamps 240 discussed above with respect to FIG. 2. Each of these components is physically coupled to a substrate, such as a PCB, e.g., polyimide, FR4, etc.

In this example, however, rather than employing the voltage clamp 440 as a thermal energy source, a discrete thermal energy source 450 is physically coupled to the substrate in proximity to the temperature-sensitive fuse 420 to enable it to provide thermal energy to the temperature-sensitive fuse 420. In this example, the thermal energy source 450 is a resistor, but may be any suitable electronic component configured to emit thermal energy, such as an incandescent light bulb or light-emitting diode. In this embodiment, the thermal energy source 450 is selectably electrically coupled to battery 470 via processor-controlled switch 472. In this example, the switch 472 is a transistor, but can be any suitable electronic switch, such as a relay.

In this example, rather than blowing the temperature-sensitive fuse 420 when the voltage clamp 440 passively generates heat in response to too much power being received by the antenna 410, the electronic device 400 includes a processor 460 that executes processor-executable instructions stored in memory 462 to receive input signals from the voltage clamp 440 and the conditioning circuit 430, detect when the received wireless power exceeds a threshold, and close the processor-controlled switch 472 to activate the thermal energy source 450 to blow the temperature-sensitive fuse 420.

Figure 5:
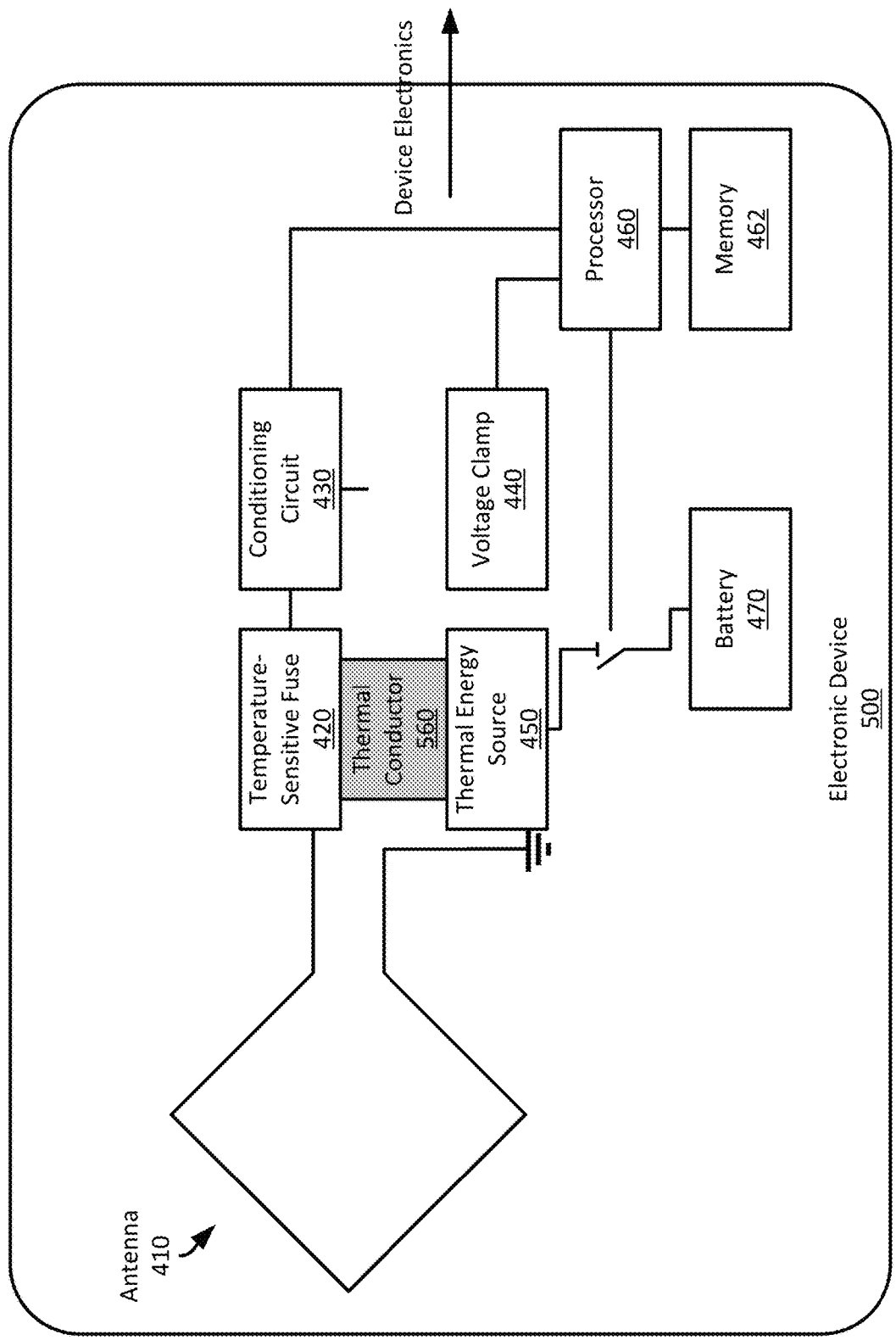

In this example, the thermal energy source 450 is placed in proximity to the temperature-sensitive fuse 420 to enable transfer of thermal energy to the temperature-sensitive 420. In some examples, however, the thermal energy source 450 may be physically coupled to the temperature sensitive fuse 420, either directly or indirectly. In one example, the thermal energy source 450 may include a resistor that is directly physically coupled to the temperature sensitive fuse 420, such as by an adhesive or one or more clips. In some examples, the thermal energy source 450 may be indirectly coupled to the temperature-sensitive fuse 420 by a thermally conductive component. FIG. 5 shows an example of such an arrangement.

Referring to FIG. 5, FIG. 5 illustrates an electronic device 500 that includes the components described above with respect to FIG. 4, but also includes a thermal conductor 560 physically coupled to each of the thermal energy source 450 and the temperature sensitive fuse 420. In this example, the thermal conductor is a metal region or island formed on the substrate to which both the thermal energy source 450 and the temperature-sensitive fuse 420 are coupled. Thus, when the thermal energy source 450 is activated and generates thermal energy, it transmits thermal energy into the thermal conductor 560, which transmits it to the temperature-sensitive fuse 420. In some examples, the thermal conductor 560 may be a metal member physically coupled between the thermal energy source 450 and temperature-sensitive fuse 420, such as described above with respect to FIG. 2.

Referring again to FIG. 4 and as discussed above, the processor 460 receives signals from each of the conditioning circuit 430 and the voltage claim 440 and determines whether to activate the switch 472. As discussed above with respect to FIG. 2, circuitry such as a voltage comparator may be employed to determine whether an amount of power received from the conditioning circuit 230 exceeds a reference voltage to determine when to activate a MOSFET. In the example shown in FIG. 4, such a feature may be employed as processor 460 to close the switch 472 to activate the thermal energy source 450. In some examples, however, the voltage comparator may be integrated within (or electrically coupled to) the voltage clamp 440 output a signal to the processor 460 indicating when a reference voltage has been exceeded. The processor 460 may then close switch 472 in response to receiving such a signal. In some examples, however, the processor 460 may receive signals from both the voltage clamp 440 and the conditioning circuit 430 and determine whether excessive power is being received from the antenna 410.

In one example, the processor 430 may receive a voltage signal from the conditioning circuit 430 and a current signal from the voltage clamp 440 and estimate the strength of the EMF applied to the antenna 410. For example, the processor 430 may estimate the strength of the EMF based on the voltage output by the conditioning circuit, which may be directly proportional to the EMF strength. To obtain an EMF strength, the processor 430 may access a lookup table based on the voltage from the conditioning circuit. In another example, the processor 430 may estimate EMF strength based on both the voltage and current output by the conditioning circuit. For example, the processor 430 may sum the voltage from the conditioning circuit with the product of the current output by the conditioning circuit multiplied by the resistance between the conditioning circuit and the input to the processor or a current sensing circuit, e.g., $V_{cond}+(I_{cond}*R)$. The calculated value may be used to access a corresponding EMF strength stored in a lookup table. The processor 460 may then compare the estimated EMF strength to a threshold and determine whether to activate the switch 472. In some examples the processor 460 may immediately activate the switch if the estimated EMF strength exceeds a threshold; however, in some examples, the processor 460 may delay activating the switch 472 until the threshold has been exceed for a predetermined period of time, or a running average of the EMF strength may be computed for a predetermined time window size, e.g., three seconds. The processor 460 may activate the switch 472 if the running average exceeds the threshold.

In some examples, even after activating the switch, the processor 460 may continue to monitor the estimated EMF strength and, if the strength drops below the threshold, the processor 460 may then close the switch. As with activating the switch, the processor 460 may immediately deactivate the switch if the estimated EMF strength drops below a threshold, or it may delay deactivating the switch until a condition is met, such as a running average EMF strength dropping below a threshold. It should be further appreciated that the threshold to activate the switch 472 may be different than the threshold to deactivate the switch 472. Such a hysteretic configuration may help prevent rapid toggling of the switch 472.

Figure 6:
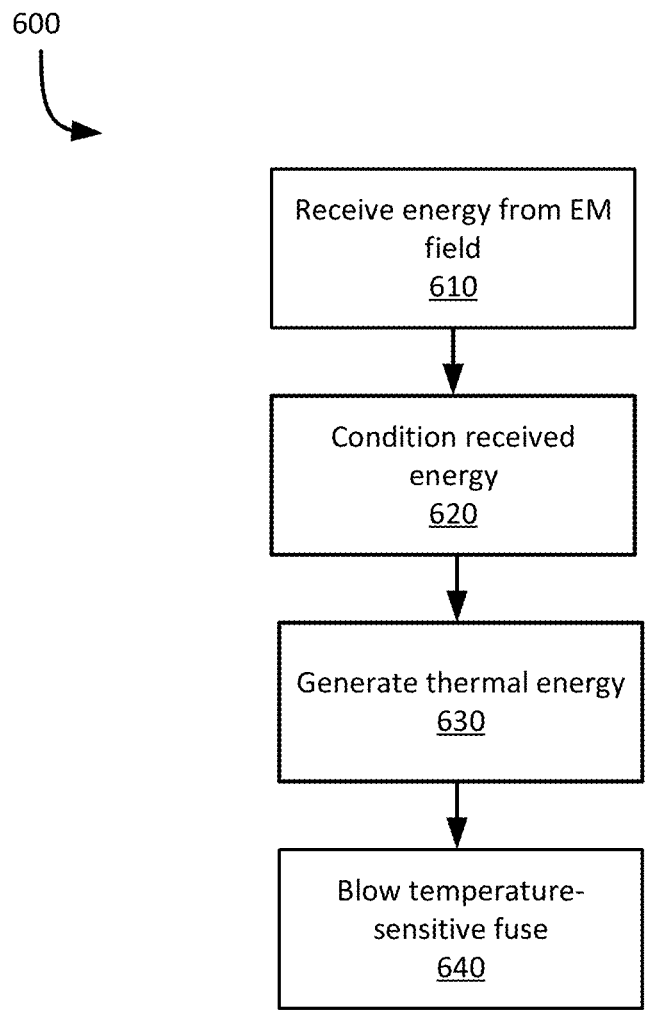
FIG. 6-7 show example methods for overcurrent protection for wireless power receivers.

Referring now to FIG. 6, FIG. 6 shows an example method 600 for overcurrent protection for wireless power receivers. The method 600 shown in FIG. 6 will be described with respect to the example electronic device 200 shown in FIG. 2; however, any suitable device according to this disclosure may be employed.

At block 610, the antenna 210 receives energy from an EMF. In this example, a device generating an alternating EMF is brought in proximity to the electronic device to apply the EMF to the antenna 210. Alternatively, the electronic device 200 may be brought into proximity of another device, such as a wireless charging device, to receive an alternating EMF output by the other device.

At block 620, the conditioning circuit 230 conditions a signal received from the antenna 210 and outputs the conditioned signal. In this example the conditioning circuit comprises a rectifier to generate a DC signal from an AC signal received from the antenna 210. However, any suitable conditioning circuit 230 may be employed to condition the received AC signal from the antenna into a form suitable for use by the device electronics.

At block 630, a thermal energy source generates thermal generating based on the conditioned signal. In this example, the voltage clamp 240 receives the conditioned signal and generates thermal energy. In some examples, the amount of thermal energy may be proportional to the conditioned signal received by the voltage clamp. The voltage clamp 240 in this example is configured to output sufficient thermal energy to blow the temperature-sensitive fuse 220 if the conditioned signal comprises more than 50 milliwatts ("mw"). However, any suitable power level may be employed according to different examples. For example, low power devices, such as implantable medical devices may have low power thresholds, such as in the range of tens of milliwatts or less. However, other devices may have larger power thresholds. For example, a smartphone may have a power threshold of 10 watts. In such an example, the voltage clamp may be configured to output sufficient thermal energy to blow the temperature-sensitive fuse 220 if more than 11 watts of power is received. Even larger power thresholds may be employed in other examples.

While in this example, the voltage clamp 240 acts as a thermal energy source, in other examples, such as described above with respect to FIGS. 2-5, other components, such as dedicated thermal energy sources, such as thermal energy source 450 may be activated to generate thermal energy. For example, the processor 460 may receive one or more signals from the conditioning circuit or a voltage clamp, determine an amount of power provided by the conditioning circuit or a strength of an EMF applied to the antenna, and activate a thermal energy source 450, such as by closing a switch 472.

At block 640, the temperature-sensitive fuse 220 receives thermal energy from the voltage clamp 240 and, after heating sufficiently, blows and electrically decouples the antenna 210 from the conditioning circuit 230. In response to the antenna 210 being electrically decoupled from the conditioning circuit 230, power is no longer transmitted to the conditioning circuit 230 by the antenna 210. In this example, because power has been disconnected from the conditioning circuit 230, the voltage clamp 240 stops generating thermal energy and begins to cool. Further, the temperature-sensitive fuse 220 may also begin to cool. If the temperature-sensitive fuse 220 is resettable, after it has cooled sufficiently, it may reset and again electrically couple the antenna 410 to the conditioning circuit 430, thereby enabling power to flow from the antenna 210 to the conditioning circuit 230.

In some examples, however, an electronic device, such as electronic device 400, may include a processor 460 that activates switch 472 to activate the thermal energy source 450. In such an example, the processor 460 may leave the switch 472 activated, even after the temperature-sensitive fuse 420 has blown. For example, the processor 460 may be programmed to deactivate the switch 472 only after a timeout period has elapsed, such as 30 seconds. Such a feature may help provide additional protection in the case where the overpowering EMF remains applied to the antenna 210 even after the fuse 420 is blown. In some cases, however, the processor 460 may immediately deactivate the switch 472 after the fuse has blown. For example, if the processor 460 is powered by wireless power received by the antenna, the processor 460 may lose power when the temperature-sensitive fuse 420 is blown, and the switch 472 may deactivate, such as based on a signal output by the processor 460 being discontinued.

In some examples, the processor 460 may also adjust a power threshold in response to the temperature-sensitive fuse 420 being blown. For example, once the fuse 420 has been blown once, it may reduce a power threshold to activate the switch by an amount, such as 10%, in anticipation of further overpower events. The threshold may then be ramped back up to its original value over time if no further overpower events occur. In examples lacking a processor, one or more reference voltages may be reduced in response to the fuse 220 being blown and may also ramp back up over time to an original value. For example, a ripple counter may reset when the fuse is blown, reducing a reference voltage by a preset amount. After power is restored, the ripple counter may begin counting up and upon reaching a preset value begin ramping the reference voltage until a second value is reached, e.g., when the ripple counter overflows. Still other techniques may be employed to provide a reduced power threshold following a overpower event.

Figure 7:
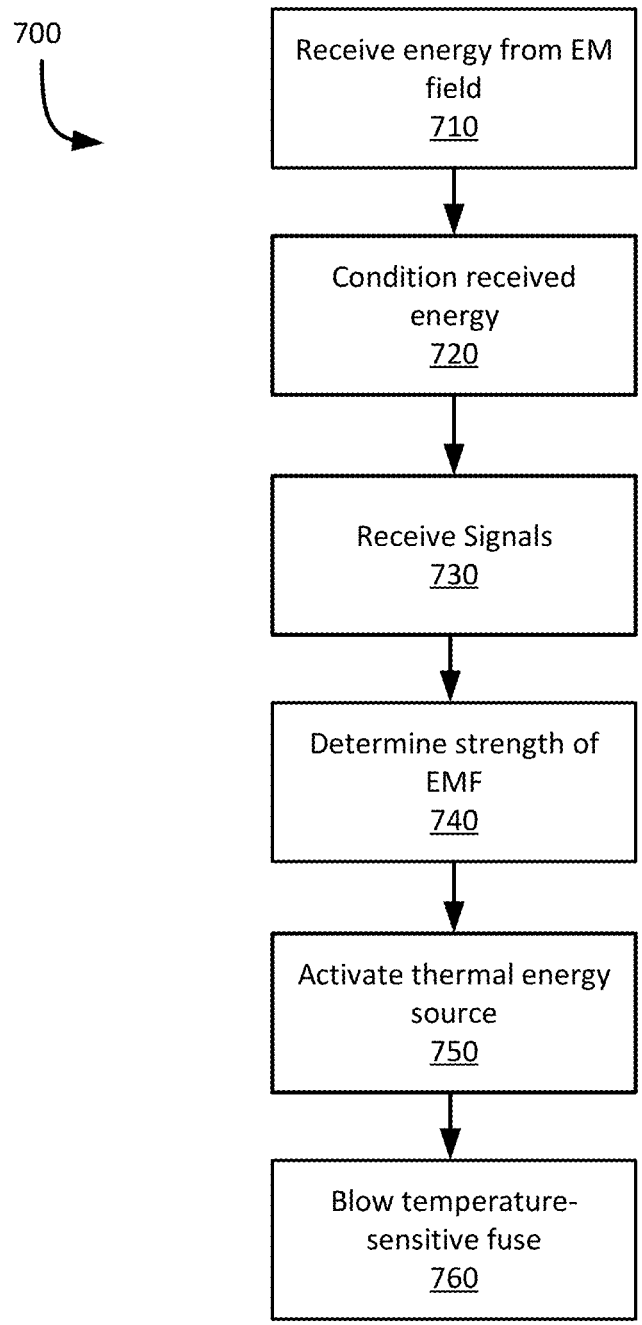

Referring now to FIG. 7, FIG. 7 shows an example method 700 for overcurrent protection for wireless power receivers. The method 700 shown in FIG. 7 will be described with respect to the example electronic device 400 shown in FIG. 4; however, any suitable device according to this disclosure may be employed.

At block 710, the antenna 210 receives energy from an EMF generally as described above with respect to block 610.

At block 720, the conditioning circuit 230 conditions a signal received from the antenna 210 and outputs the conditioned signal generally as described above with respect to block 620.

At block 730, the processor 460 receives a signal from at least one of the conditioning circuit 430 or the voltage clamp 440. For example, the processor 460 may receive a signal indicating a voltage output by the conditioning circuit 430 or a current output by the voltage clamp 440. In some examples, the processor 460 may receive both a voltage signal from the conditioning circuit 430 and a current signal from the voltage clamp 440.

At block 740, the processor 460 determines a strength of an EMF applied to the antenna 410 based on one or more signals received at block 730.

At block 750, the processor 460 activates a thermal energy source 450 in response to determining that the strength of the EMF applied to the antenna exceeds a threshold, generally as described above with respect to FIG. 4. In this example, the processor 460 activates the thermal energy source 450 by closing a switch 472 to electrically couple the thermal energy source to a battery. However, in some examples, the processor 460 may itself transmit a power signal to the thermal energy source 450, such as by outputting a signal to an amplifier electrically coupled between the processor and the thermal energy source 450.

At block 760, the temperature-sensitive fuse 420 receives thermal energy from the thermal energy source 450 and, after heating sufficiently, blows and electrically decouples the antenna 410 from the conditioning circuit 430 generally as described above with respect to block 640.

As discussed with block 640, the processor 460 may immediately deactivate the thermal energy source 450 after the temperature-sensitive fuse 420 blows, or it may delay the deactivation for a period of time. Further, it may adjust a power threshold above which to activate the thermal energy source 450.

Figure 8:
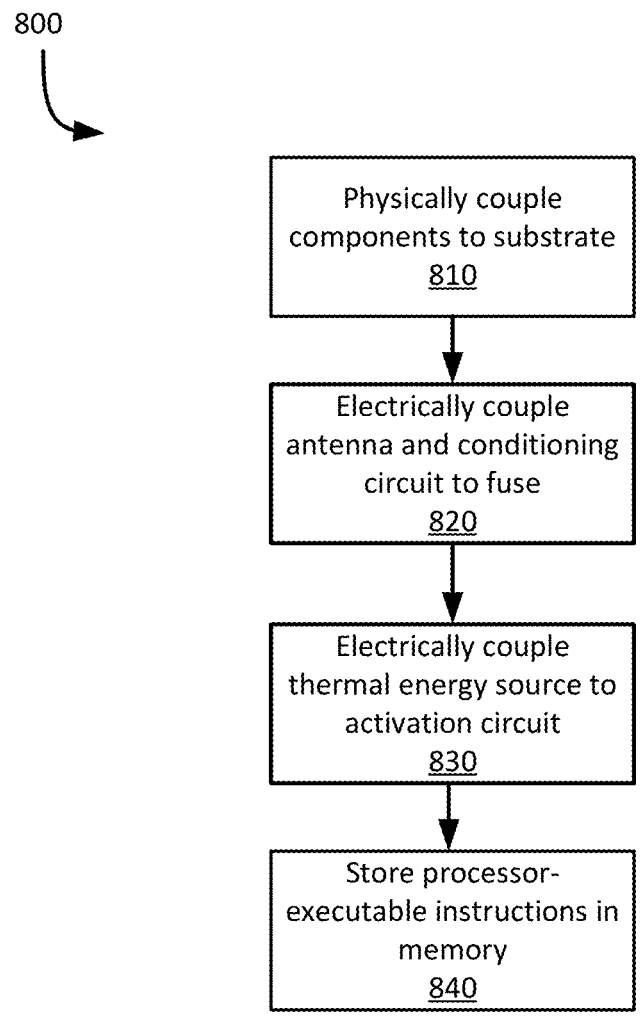
FIG. 8 shows an example method of manufacture for overcurrent protection for wireless power receivers.

Referring now to FIG. 8, FIG. 8 shows an example method 800 of manufacturing an example electronic device including overcurrent protection for wireless power receivers. The example method 800 shown in FIG. 8 will be discussed with respect to the electronic device 200 shown in FIG. 2; however, it may be used in the context of any suitable electronic device according to this disclosure.

At block 810, the antenna 210, temperature-sensitive fuse 220, conditioning circuit 230, and voltage clamp 240 are physically coupled to a substrate, such as a PCB. In some examples, other electronic components of the electronic device 200 may be physically coupled to the substrate as well. In the example shown in FIG. 4, other electronic components, such as a battery 470, switch 472, thermal energy source 450, or processor 460 may also be physically coupled to the substrate. In some examples, some components be not be physically coupled to the substrate, such as a battery 470 or thermal energy source 450. In addition, other components may be physically coupled to the substrate, or may be physically coupled to one or more electronic components. For example, a thermal conductor, e.g., thermal conductor 360 may be physically coupled between the voltage clamp 340 and temperature-sensitive fuse 320, but not physically coupled to the substrate. However, in some examples, a thermal conductor, such as a thermal island, may be physically formed on the substrate. Similarly, the antenna 210 may be pre-formed and physically coupled to the substrate, or may be formed directly on the substrate, such as by applying a wire trace to the substrate.

At block 820, the antenna 210 is electrically coupled to the temperature sensitive fuse 220, such as by applying a metal trace between an output of the antenna 210 and an electrical contact of the temperature-sensitive fuse 220. In addition, the conditioning circuit 230 is electrically coupled to the temperature sensitive fuse 220, such as by coupling a second electrical contact of the temperature-sensitive fuse 220 to an input of the conditioning circuit 230.

It should be appreciated that block 820 may be performed before block 810. For example, electrical traces and electrical contacts may be formed on the substrate before any electronic components are physically coupled to the substrate.

At block 830, the thermal energy source is coupled to an activation circuit. In this example, the voltage clamp 240 operates in part as a thermal energy source, and may be activated based on energy output by the conditioning circuit 230. Thus, in this example, the voltage clamp 240 is electrically coupled to the conditioning circuit 230, such as by applying an electrical trace to the PCB. With respect to the example shown in FIG. 4, a discrete thermal energy source 450, such as a resistor, may be electrically coupled to a switch 472 by applying an electrical trace to the substrate between the two components. Still other electrical traces may be applied as well, such as to electrically coupled the processor 460 to the switch 472 and to electrically coupled the battery 470 to the switch 472. In addition, one or more electrical traces may be applied to the substrate to electrically couple the conditioning circuit 430 or the voltage clamp 440 to the processor 460. As discussed above with respect to block 820, it should be appreciated that block 830 may be performed before block 810. For example, electrical traces and electrical contacts may be formed on the substrate before any electronic components are physically coupled to the substrate.

At block 840, processor-executable instructions are stored in a memory of the electronic device. With respect to the example shown in FIGS. 2 and 3, block 840 may not be performed if no processor is included in the device. However, with respect to the examples shown in FIGS. 4 and 5, the processor 460 may be programmed with processor-executable instructions, such as to perform aspects of methods according to this disclosure. In this example, memory 462 is programmed with the processor-executable instructions to be executed by the processor 462. However, in some examples, the processor 460 includes a programmable non-volatile memory that can be programmed with processor-executable instructions. In some examples, the processor 460 may be an application-specific integrated circuit ("ASIC") that is not separately programmed with processor-executable instruction, thus in some examples, block 840 may not be performed.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A device comprising:
a wireless power antenna comprising a wire coil;
a conditioning circuit electrically coupled to the wireless power antenna to receive an electric power signal from the wireless power antenna;
a temperature-sensitive fuse electrically coupled between the wireless power antenna and the conditioning circuit and configured to electrically decouple the wireless power antenna from the conditioning circuit in response to being blown; and
a thermal energy source configured to generate thermal energy based on an electrical signal from an output of the conditioning circuit, the thermal energy source positioned proximate the temperature-sensitive fuse.

2. The device of claim 1, wherein the thermal energy source is electrically coupled to an output of the conditioning circuit, and wherein the thermal energy source comprises a voltage clamp circuit.

3. The device of claim 2, wherein the voltage clamp circuit comprises a Zener diode, an active rectifier, a voltage threshold circuit coupled to a metal oxide semiconductor field effect transistor switch.

4. The device of claim 1, further comprising a processor electrically coupled to (i) an output of the conditioning circuit to receive an electrical signal from the conditioning circuit, and (ii) the thermal energy source, wherein the processor is configured to execute processor-executable instructions stored in a memory of the device to:

determine an amount of power provided by the wireless power antenna based on one or more signals received from the conditioning circuit; and in response to a determination that the amount of power exceeds a power threshold, activate the thermal energy source to blow the temperature-sensitive fuse.

5. The device of claim 4, further comprising a power source, wherein the processor is configured to electrically couple the power source to the thermal energy source to activate the thermal energy source.

6. The device of claim 4, wherein the processor is further configured to execute processor-executable instructions stored in the memory of the device to estimate an amplitude of an electromagnetic field ("EMF") applied to the wireless power antenna, and wherein determining the amount of power is based on the estimated amplitude of the EMF.

7. The device of claim 6, further comprising a voltage clamp circuit electrically coupled to the conditioning circuit, and wherein the estimated amplitude of the EMF is based on a voltage output by the conditioning circuit and a current output by the voltage clamp circuit.

8. The device of claim 1, wherein the temperature-sensitive fuse comprises a polymeric positive temperature coefficient fuse.

9. The device of claim 1, wherein the temperature-sensitive fuse comprises a bimetallic strip or a shape memory alloy.

10. The device of claim 1, wherein the thermal energy source is physically coupled to the temperature-sensitive fuse.

11. The device of claim 10, wherein a metal member is physically coupled to the thermal energy source and the temperature-sensitive fuse to physically couple the thermal energy source to the temperature-sensitive fuse.

12. The device of claim 11, wherein the metal member comprises a metal region formed on a substrate, wherein the temperature-sensitive fuse and the thermal energy source are coupled to the substrate within the metal region.

13. The device of claim 1, wherein the temperature-sensitive fuse is physically coupled to a first side of a substrate, and the thermal energy source is coupled to a second side of the substrate opposite the first side of the substrate and opposite the temperature-sensitive fuse.

14. The device of claim 1, wherein the device is disposed within an implantable medical device.

15. The device of claim 1, wherein the device is disposed within a wearable medical device.

16. A method comprising:
receiving, by a wireless power antenna comprising a wire coil, energy from an electromagnetic field ("EMF");
electrically conditioning, by a conditioning circuit electrically coupled to the wireless power antenna, the received energy to generate a voltage signal;
generating, by a thermal energy source, thermal energy using the generated voltage signal; and
blowing a temperature-sensitive fuse using the generated thermal energy to electrically decouple the wireless power antenna from the conditioning circuit.

17. The method of claim 16, further comprising:
receiving, by a processor, one or more signals from the conditioning circuit;
determining, by the processor, an amount of power provided by the wireless power antenna based on the one or more signals received from the conditioning circuit; and in response to determining that the amount of power exceeds a power threshold, activating, by the processor, the thermal energy source to blow the temperature-sensitive fuse.

18. The method of claim 17, further comprising outputting, by the processor, a signal to a switch to electrically couple a power source to the thermal energy source to activate the thermal energy source.

19. The method of claim 17, further comprising estimating, by the processor, an amplitude of an electromagnetic field ("EMF") applied to the wireless power antenna, and wherein determining the amount of power is based on the estimated amplitude of the EMF.

20. The method of claim 19, further comprising receiving, by the processor, one or more current signals from a voltage clamp circuit; and wherein:
at least one of the one or more signals received from the conditioning circuit comprises a voltage signal, and
estimating the amplitude of the EMF is based on the voltage signal and at least one of the one or more current signals.

21. The method of claim 16, wherein the temperature-sensitive fuse comprises a polymeric positive temperature coefficient fuse.

22. The method of claim 16, wherein the temperature-sensitive fuse comprises a bimetallic strip or a shape memory alloy.

23. The method of claim 16, wherein the thermal energy source is physically coupled to the temperature-sensitive fuse.

24. A method of manufacturing a device comprising:
physically coupling (i) a wireless power antenna comprising a wire coil, (ii) a conditioning circuit, (iii) a temperature-sensitive fuse, and (iv) a thermal energy source to a substrate;
electrically coupling the wireless power antenna and the conditioning circuit to the temperature-sensitive fuse, wherein the temperature-sensitive fuse electrically couples the wireless power antenna to the conditioning circuit; and
wherein the thermal energy source is electrically coupled to a circuit configured to activate the thermal energy source, the thermal energy source positioned in proximity to the temperature-sensitive fuse.

25. The method of claim 24, further comprising physically coupling a voltage clamp circuit to the substrate, and electrically coupling the voltage clamp circuit to the conditioning circuit and the thermal energy source, the voltage clamp circuit configured to supply a signal to the thermal energy source to activate the thermal energy source.

26. The method of claim 24, further comprising physically coupling a processor, a voltage clamp circuit, a battery, and a switch to the substrate, and electrically coupling:
the switch between the battery and the thermal energy source; and
the processor to the conditioning circuit, the voltage clamp circuit, and the switch.

27. The method of claim 26, further comprising storing processor executable instructions in a memory of the device, the processor executable instructions configured to cause the processor to:
determine an amount of power provided by the wireless power antenna based on one or more signals received from the conditioning circuit; and in response to a determination that the amount of power exceeds a power threshold, close the switch to activate the thermal energy source to blow the temperature-sensitive fuse.

28. The method of claim 27, further comprising storing processor executable instructions in a memory of the device to cause the processor to estimate an amplitude of an electromagnetic field ("EMF") applied to the wireless power antenna, and wherein determining the amount of power is based on the estimated amplitude of the EMF.

29. The method of claim 28, wherein the estimated amplitude of the EMF is based on a voltage output by the conditioning circuit and a current output by the voltage clamp circuit.

30. The method of claim 27, further comprising physically coupling a non-transitory computer-readable medium to the substrate and electrically coupling the non-transitory computer-readable medium to the processor, and wherein the non-transitory computer-readable medium comprises the memory.

31. The method of claim 27, wherein the processor comprises the memory.

32. The method of claim 24, where the thermal energy source is electrically coupled to the circuit configured to activate the thermal energy source based on an electrical signal from an output of the conditioning circuit.

\* \* \* \* \*